United States Patent [19]

Berg et al.

[11] Patent Number: 4,850,008
[45] Date of Patent: Jul. 18, 1989

[54] METHOD AND APPARATUS FOR DISCRIMINATION BETWEEN DIFFERENT KINDS OF DATA TRANSMISSION

[75] Inventors: Joseph F. Berg, Wheeling; Rudolf P. Chalupa; Prabhakar Pokala, both of Chicago, all of Ill.

[73] Assignee: Extel Corporation, Northbrook, Ill.

[21] Appl. No.: 162,204

[22] Filed: Feb. 29, 1988

[51] Int. Cl.$^4$ .............................................. H04Q 1/30
[52] U.S. Cl. ...................................... 379/93; 379/100; 379/373; 358/400
[58] Field of Search ................... 379/93, 90, 94, 96, 379/100, 373; 358/256

[56] References Cited

U.S. PATENT DOCUMENTS

| | | | |
|---|---|---|---|
| 3,558,811 | 1/1971 | Montevecchio | 178/6 |
| 3,830,962 | 8/1974 | Mailloux | 178/6 |
| 3,958,088 | 5/1976 | Vieri | 178/26 |
| 4,297,727 | 10/1981 | Ogawa et al. | 358/261 |
| 4,490,746 | 12/1984 | Moriguchi | 358/286 |
| 4,494,149 | 1/1985 | Furukawa | 358/257 |
| 4,558,369 | 12/1985 | Shinohara et al. | 358/257 |
| 4,578,537 | 3/1986 | Faggin et al. | 179/2 DP |
| 4,583,124 | 4/1986 | Tsuji et al. | 358/256 |
| 4,584,434 | 4/1986 | Hasimoto | 179/2 A |
| 4,620,294 | 10/1986 | Leung et al. | 364/900 |
| 4,639,553 | 1/1987 | Kiguchi | 379/377 |
| 4,652,933 | 3/1987 | Koshiishi | 358/256 |
| 4,658,417 | 4/1987 | Hashimoto | 379/97 |
| 4,663,778 | 5/1987 | Takahashi | 379/100 |
| 4,672,459 | 6/1987 | Kudo | 358/257 |
| 4,677,660 | 6/1987 | Yoshida | 379/100 |

OTHER PUBLICATIONS

"Integrated Switching System" NEAX 51, L. Kohashi et al, NEC Res & Dev. (Japan) No. 55, Oct. 1979.

Primary Examiner—Stafford D. Schreyer
Attorney, Agent, or Firm—Kinzer, Plyer, Dorn, McEachran & Dorn

[57] ABSTRACT

A data communication station comprises a first and second data terminals operating under first and second transmission standards, and a selective switching means to connect those terminals to a single communication line; the first data terminal is usually a teleprinter or other character-by-character terminal capable of operating under applicable standards such as those for Economy Telex or for DDD (Direct Distance Dialing) ASCII transmissions, whereas the second data terminal may be a facsimile machine or other graphics terminal operating under the CCITT T-series standards. In one embodiment the switching means is a free-standing control unit that may be connected to virtually any conventional data terminals; in another version the switching means is incorporated in an input/output board in one data terminal and utilizes a part of the logic of that data terminal. The switching means normally maintains the two data terminals connected to the communication line with each in its on-hook condition; in response to the ring signal of an incoming call, both data terminals initially go off-hook. The switching means then disconnects one terminal (usually the facsimile terminal) from the line while maintaining an off-hook condition for the line, and monitors the line for occurrence of a recognition signal for the other terminal in a procedure that connects the line to only one of the data terminals to complete the call, depending on the monitoring function.

28 Claims, 5 Drawing Sheets

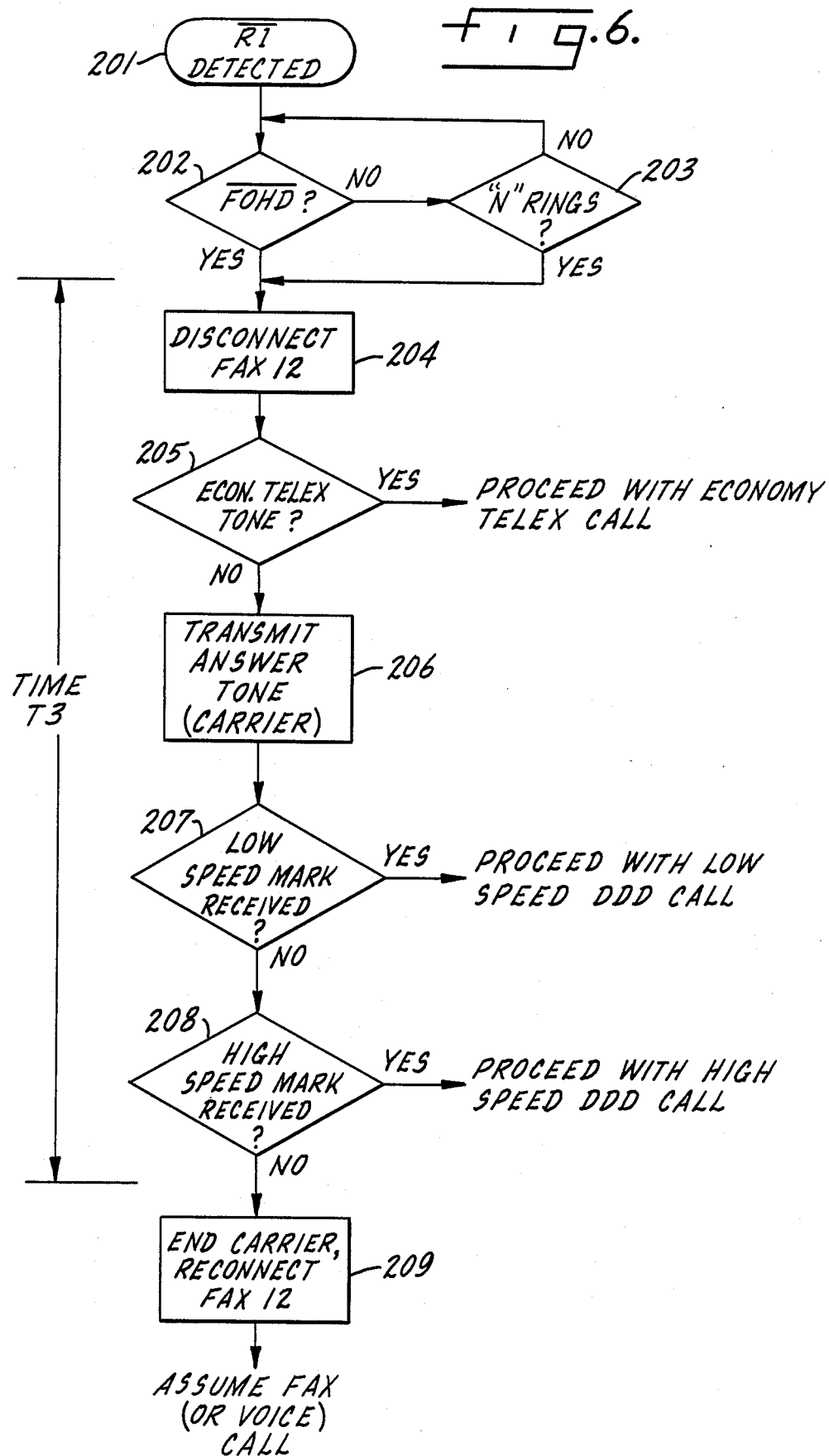

METHOD AND APPARATUS FOR DISCRIMINATION BETWEEN DIFFERENT KINDS OF DATA TRANSMISSION

BACKGROUND OF THE INVENTION

Facsimile data communication terminals have become quite popular for a variety of commercial, industrial, professional, governmental, and other applications. In many fields ready availability of facsimile communication is now considered to be essential.

Data communication by character transmission, as contrasted with the graphic transmission afforded by facsimile, is also virtually an essential requirement for many businesses, industrial plants, professional firms, governmental units, and others. In the past, data communication terminals of this kind have been incorporated into telex and TWX networks; more recently, transmissions of this kind have been carried out in accordance with DDD/ASCII transmission standards or Economy Telex standards, using conventional telephone lines. Indeed, even the telex and TWX networks may utilize public telephone lines for their transmissions in some instances.

For a business, a professional office, or other establishment where it is necessary or desirable to have both a facsimile terminal and a telex or DDD terminal, it has been necessary to employ two separate communication lines, with the attendant costs of installation and continuing monthly rental fees, even though both lines may be part of the same telephone network. This has been true even for offices and establishments that have relatively limited traffic which could easily be carried on a single communication line. There has been no generally available automated switching apparatus that could discriminate between incoming calls so as to make it feasible to operate both a facsimile terminal and a DDD/telex terminal on a single telephone line or other like communication line.

With increasing popularity of the use of computers as communication tools, particularly personal computers, a similar situation is developing for organizations that want to have data communication to distant locations both by a computer and by a facsimile terminal. To do so, it is usually necessary to have two telephone lines, with the attendant initial and continuing difficulties and expenses.

SUMMARY OF THE INVENTION

It is a principal object of the present invention, therefore, to provide an effective, inexpensive, automated switching method and apparatus that allows two substantially different data communication terminals, such as a graphics terminal (facsimile) and a character terminal (Economy Telex, DDD/ASCII, computer, etc.), to share a single telephone line or other communication line, selectively routing any incoming data communication call to the appropriate terminal and precluding simultaneous use of the communication line by both terminals.

A further object of the invention is to provide a new and improved effective, inexpensive, automated switching method and apparatus that allows two quite different data communication terminals (e.g. a facsimile terminal and a DDD/telex terminal or a computer) to share a single telephone line or like communication line, utilizing a small, unobtrusive electronic control unit connected to separate data communication terminals by ordinary telephone cables, or built into one communication terminal, such as a telex terminal, that is then connected to a different kind of data communication terminal.

A specific object of the invention is to provide a new and improved automated control method and apparatus of the kind described above that utilizes circuits which are simple and inexpensive in construction ye reliable and effective in operation, and that affords a long service life.

The method of the invention pertains to the operation of a data communication station comprising a first data terminal operating under a first transmission standard under which an incoming call starts with a preliminary ring signal and a subsequent recognition signal, a second data terminal operating under a second, different transmission standard under which an incoming call starts with a preliminary ring signal and may include a subsequent recognition signal, and switching means for connecting a telephone line or like communication line to either of the data terminals for completion of an incoming call that starts with a ring signal. In the data communication station the switching mean normally maintains at least one of the data terminals connected to the communication line in an on-hook condition prior to initiation of a call. The method of operation, for an incoming call, comprises:

A. permitting the one data terminal, responsive to a ring signal received on the communication line, to go off-hook;

B. disconnecting the one data terminal from the communication line, by operation of the switching means, while maintaining an apparent off-hook condition for the communication line;

C. monitoring the communication line for occurrence of a recognition signal within a given recognition time interval;

D. actuating the switching means to connect only the first data terminal to the communication line, off-hook, to complete the call to the first data terminal, when a recognition signal from the first transmission standard is identified in step C; and E. actuating the switching means to connect only the second data terminal to the communication line, off-hook, to complete the call to the second data terminal when no recognition signal from the first transmission standard is identified in step C.

The apparatus of the invention that performs the foregoing method may be embodied in a free-standing switching control unit connected to conventional data terminals. Alternatively, the apparatus may be incorporated in an input/output circuit for a first data terminal, with that circuit connected to a second, different data terminal. In the latter instance the control unit may be embodied, in part, in a program for computer circuits already present in the first terminal.

BRIEF DESCRIPTION OF THE DRAWINGS

FIG. 6 is a partial flow chart for functions of the embodiment of FIGS. 4 and 5.

DESCRIPTION OF THE PREFERRED EMBODIMENTS

Figure 1:
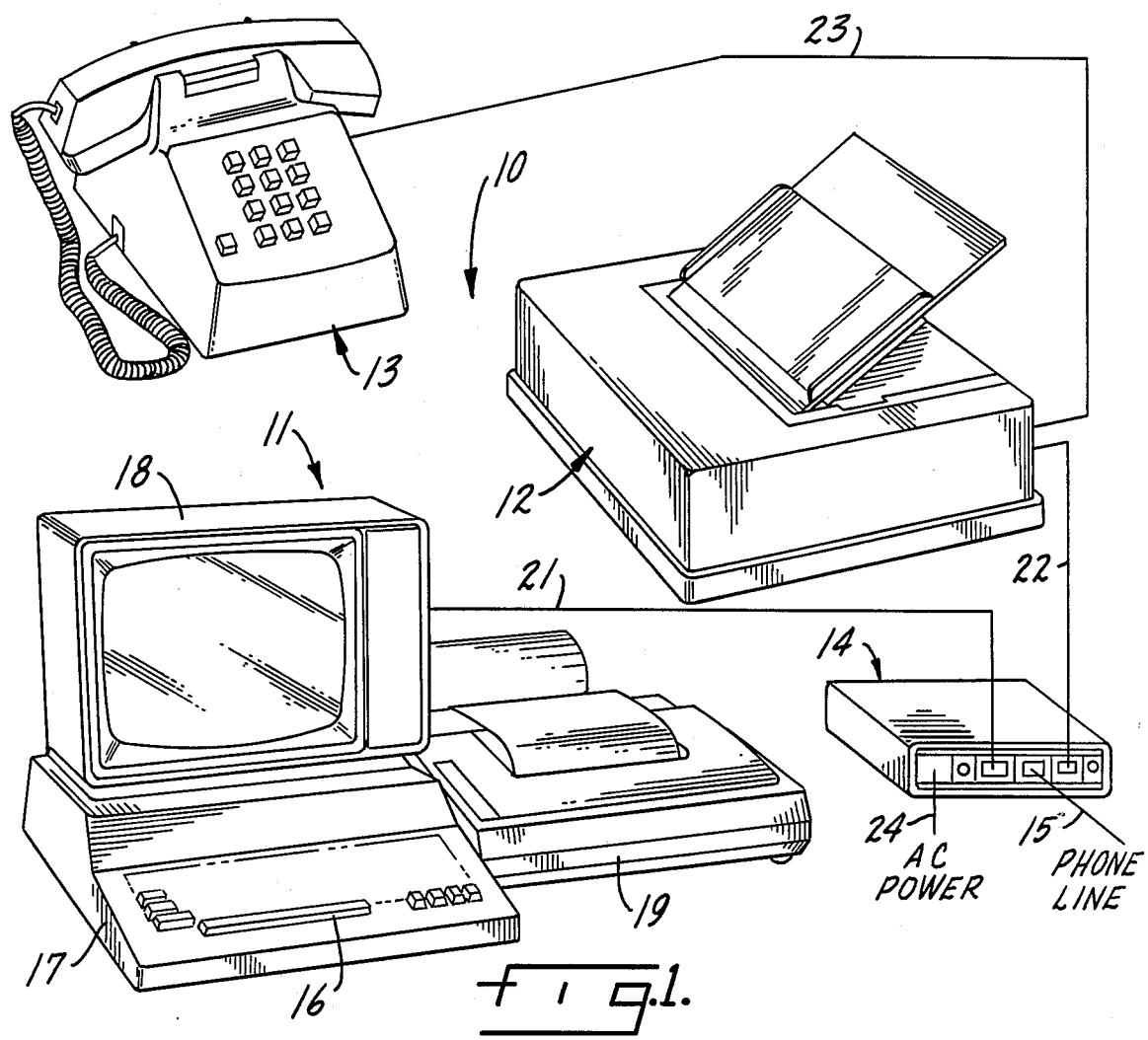
FIG. 1 is a pictorial schematic diagram of a data communication station that incorporates a free-standing control unit comprising one embodiment of the apparatus of the present invention.

FIG. 1 illustrates a data communication station 10 that includes a first data terminal 11, a second data terminal 12, and a conventional telephone instrument or terminal 13 for voice communication. The two data communication terminals 11 and 12 and the voice terminal 13 are all connected to a conventional telephone line or other communication line 15 by a control unit 14. The voice terminal, telephone 13, is shown connected to terminal 12; it could be connected to control unit 14 or to terminal 11. Control unit 14 constitutes a selective automated switching means for connecting line 15 to the terminal equipment, particularly to the two data communication terminals 11 and 12.

In station 10 the first data terminal 11 is a conventional character transmission transceiver; it is most likely to be an Economy Telex or DDD/ASCII data terminal able to operate on one or more of such character transmission standards. Terminal 11 includes a keyboard 16 that is incorporated in a common housing with a control logic unit 17. A video monitor 18 is included in terminal 11. Terminal 11 also includes a printer 19, which may be a dot matrix printer or any other suitable printer mechanism. The electrical connection from control unit 14 to data terminal 11 is generally indicated in FIG. 1 by a line segment 21.

In station 10 the second data terminal 12 is a facsimile transceiver. It is connected to control 14 by an appropriate electrical line schematically indicated at 22. Similarly, a telephone line connection 23 is provided between facsimile terminal 12 and telephone 13. Finally, an external power connection to control unit 14 is provided by a line 24. There would also be power line connections (not shown) for terminals 11 and 12.

Before considering operation of station 10, a brief review of the conventional operational sequences of terminals 11 and 12 on incoming calls is desirable.

The character transmission terminal 11, as previously noted, may be provided with control circuits for DDD/ASCII operation, for Economy Telex, or for computer-computer communication; it might also have controls appropriate to conventional telex or TWX operation in an area where such services use a public switched communication network. In any of these configurations an incoming call intended for terminal 11 starts with a ring signal on the line connection 21 to the terminal. In station 10, the same incoming ring signal is also applied to terminals 12 and 13.

When terminal 11 recognizes an incoming ring signal, it is actuated to an off-hook condition by its own internal controls. This off-hook condition is applicable to line 15, via connector 21 and control unit 14. After a two second delay in answering a call (required for telephone system billing purposes) terminal 11 transmits an "answer" tone or carrier, (e.g. 2225 Hz) over its telephone line connection 21. The sending station that has originated the incoming call to terminal 11 recognizes this answer tone and sends an originate signal to terminal 11. For low speed DDD/ASCII service this originate signal may be a plain "mark" tone at 1270 Hz. A high speed origination terminal transmits a scrambled "mark" signal of somewhat more complex form that is readily distinguished in terminal 11. The answer and originate signals are referred to hereinafter as recognition signals pertaining to the transmission standards under which the character transmission terminal 11 operates. At this point terminal 11 is ready for operation, at either a low speed or high speed, and the incoming call proceeds with transmission of data to the terminal. When the call is finished, the control and logic circuits 17 of terminal 11 cause the terminal to revert to an on-hook condition.

For Economy Telex, the transmission standard applicable to the first data terminal 11 is somewhat different. As before, an incoming call is initiated by a ring signal that is identified by the logic circuit 17 of the terminal. As a consequence, terminal 11 is actuated to an off-hook condition. Terminal 11 then waits for an "alerting" tone, which again may be a 2225 Hz signal. In this instance, though, the alerting tone is originated at the sending station. Thereafter, a further recognition signal is transmitted by terminal 11 to the sending station and, when the Economy Telex protocol for initiation of a call is fully performed, the data transmission to terminal 11 proceeds. Generally speaking, the Economy Telex recognition code signals are the reverse of those for DDD/ASCII, as regards direction of transmission.

The recognition protocol applicable to the graphic facsimile terminal 12 has some elements in common with the transmission standards applicable to the character terminal 11; in other respects, however, the two transmission standards are distinctively different from each other. Thus, an incoming call to facsimile terminal 12 on its telephone line connection 22 begins with a ring signal that is recognized by appropriate logic circuits in terminal 12. The logic and control circuits of terminal 12 take the terminal to an off-hook condition, a condition that is signalled to line 15 through line connection 22. After an appropriate two second delay terminal 12 supplies an FSK (Frequency Shift Keying) signal to its telephone connection line 22 to inform the sending station as to the kind of facsimile standards to which terminal 12 is responsive. These standards, all governed by CCITT T-series standards, govern facsimile terminals of Groups I, II and III and the different speed capabilities that can apply to Group III machines. Thereafter, the originating station transmits a training sequence signal to facsimile terminal 12 which, if received correctly, is acknowledged by a return signal originated within terminal 12, whereupon data facsimile transmission begins. It may be necessary to have the originating station send the training sequence more than one time; after a limited number of unsuccessful tries, usually four, the logic and control circuitry in terminal 12 will conclude that the call cannot be completed and terminal 12 reverts to an on-hook condition.

From the foregoing brief review of transmission standards and operating procedures applicable to the first and second data terminals 11 and 12 of station 10, it is seen that the two transmission standards are substantially different and that each includes recognition signals, with those recognition signals again being substantially different from each other. Control unit 14 affords a switching means for connecting telephone line 15 to either of the two data communication terminals 11 and 12 in order to complete an incoming data communication call, depending upon the nature of that call and the terminal for which it is intended. When there is no call in progress, control unit 14 maintains both of the data terminals 11 and 12 connected to communication line 15 in an on-hook condition. The control unit also limits access to line 15 to either one, but not both, of terminals 11 and 12 for outgoing calls.

Any incoming data communication call to station 10 begins with a ring signal that is supplied, through the switching means comprising control unit 14, to both the first data terminal 11 and the second data terminal 12. In response to the incoming ring signal, both data terminals 11 and 12 are actuated to off-hook condition by their own internal control circuits. As a consequence, the data terminals each signal an off-hook condition, through switching means 14, to communication line 15. There is a delay for terminals 11 and 12 going off-hook, preferably ranging from three to nine seconds, as described more fully in conjunction with FIGS. 2 and 3.

After the off-hook condition for station 10 has been signalled to the sending station over line 15, the switching circuits in control unit 14 are actuated to disconnect one of the two data terminals 11 and 12 from communication line 15. In station 10 it is the facsimile terminal 12 that is now disconnected from the communication line. This is accomplished without changing the off-hook condition for station 10 as far as communication line 15 is concerned; to the telephone system and originating station connected to line 15, station 10 still exhibits an off-hook condition.

At this stage of operation control unit 14 monitors communication line 15 for recognition signals of the kind provided in the transmission standard or standards under which the first data terminal, terminal 11, operates. Thus, assuming that terminal 11 functions under the DDD/ASCII standards, the operating circuits in control unit 14 monitor phone line 15 for an "answer" tone or carrier signal at 2225 Hz, originated by the sending station. Similarly, if terminal 11 is configured to function as a part of the Economy Telex network, the switching means comprising control unit 14 looks for an "alerting" tone, which again is 2225 Hz but is going in the opposite direction on the line.

If a recognition signal, whether the answer tone or the alerting tone noted above, is identified within a given recognition time interval, usually about ten to twelve seconds, then the switching circuits in control unit 14 are conditioned to keep data terminal 11 connected to telephone line 15. The second data terminal, facsimile machine 12, on the other hand, is maintained in disconnected condition. With this configuration of the switching circuits and control unit 14, the call is complete and the incoming data signal is supplied to terminal 11. When data transmission is completed, terminal 11 reverts to an on-hook condition and the switching circuits in control unit 14 are restored to their original quiescent operating condition with terminals 11 and 12 connected to line 15 but both in an on-hook condition.

For the incoming call described immediately above, it may happen that the recognition signals do not coincide with any transmission standard applicable to the character transmission transceiver, terminal 11. Of course, this is the situation when the incoming call is intended for facsimile terminal 12. For a facsimile call, at the end of the recognition interval of about eleven seconds there has been no identification of any recognition signal from any transmission standard applicable to character transmission terminal 11. Consequently, the switching means of control unit 14 are actuated to connect terminal 12, which has been waiting in an off-hook condition, to communication line 15. At the same time, the previous line connection to terminal 11 is interrupted. In this manner, completion of the incoming call to facsimile terminal 12, without interference from terminal 11 and with terminal 11 effectively disconnected from line 15, is carried out. For terminal 12, like terminal 11, the end of a call proceeds the same as in any conventional system except that control unit 14 reverts to its original state.

For outgoing calls, each of the data communication terminals 11 and 12 and the telephone instrument 13 function in the normal manner, as far as a station operator is concerned. Thus, starting with the assumption that station 10 is in its quiescent state with each of the devices 11–13 effectively connected, through switching unit 14, to telephone line 15, and with each terminal in an on-hook condition, the station operator may desire to send a data message to a remote location using the first data terminal 11. This outgoing call is initiated, through keyboard 16, in the usual way. As soon as the call is started, with flow of loop current on phone line 15, control unit 14 disconnects facsimile terminal 12 (and telephone 13) so that those terminals cannot be used. During the outgoing call from terminal 11, any attempt at an incoming call to any of terminals 11–13 from any location encounters the usual busy signal, due to conventional operation of the telephone network of which line 15 is a part. At the same time, the switching circuits in control unit 14 preclude either facsimile terminal 12 or telephone 13 interfering with transmission on line 15. That is, as far as terminals 12 and 13 are concerned, the telephone line 15 is inaccessible and no message can be sent or received.

The same situation applies for any data communication call originated through terminal 12. Thus, if terminal 12 incorporates a keypad or other means to originate a call, it can be actuated to seize line 15, assuming no call is going forward. Once loop current appears on line 15, terminals 11 and 13 are locked out and any attempted incoming call encounters a busy condition for the line. On the other hand, if the facsimile call is to be initiated preliminarily through telephone instrument 13, as is often done, depending upon the facsimile equipment, this action is carried out in the usual manner.

Figure 2:
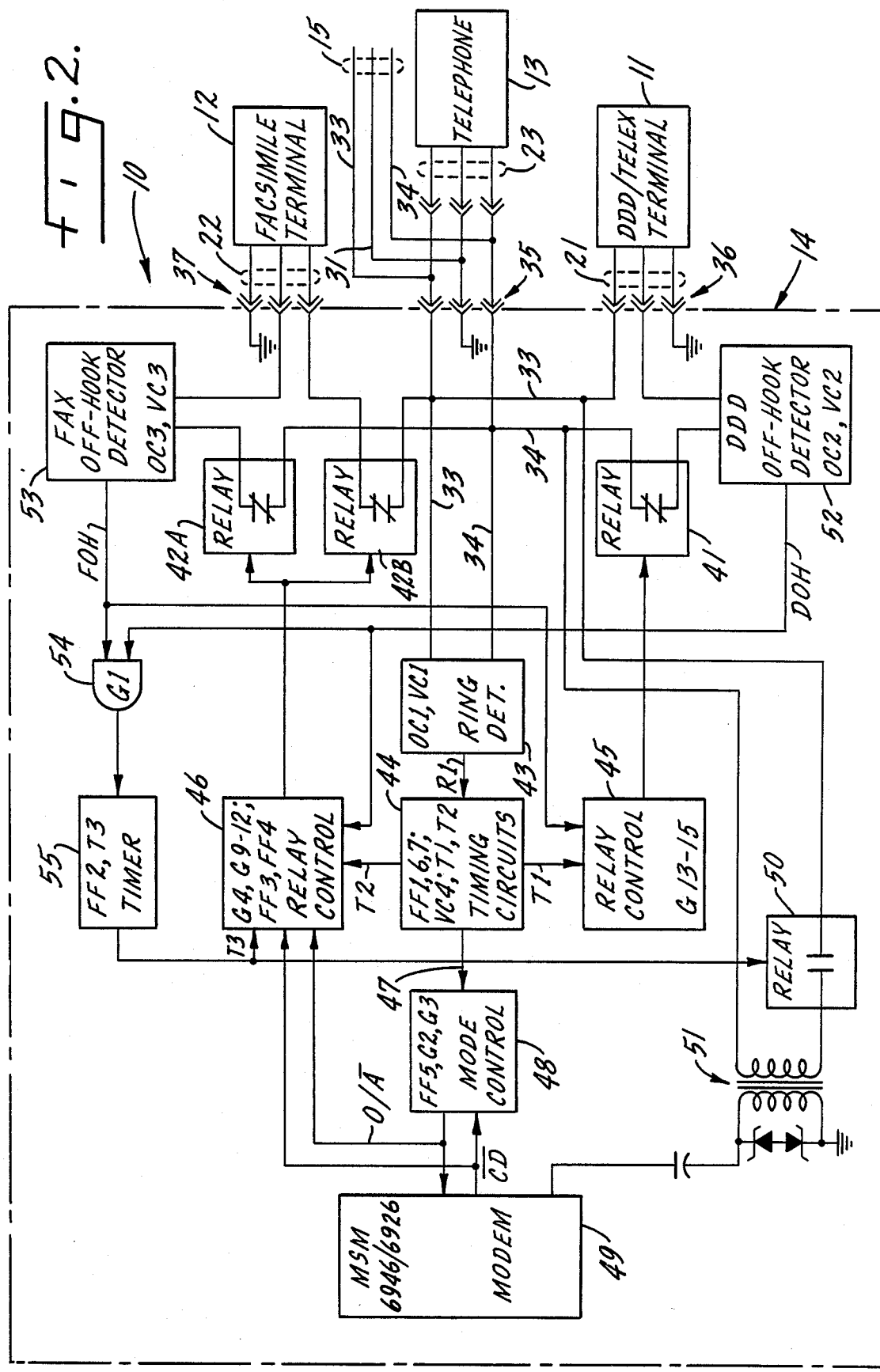
FIG. 2 is a simplified schematic block diagram of the control circuits for the station of FIG. 1.

FIG. 2 affords a simplified schematic block diagram of one circuit arrangement that can be utilized to implement the embodiment of the invention illustrated in FIG. 1, particularly control unit 14. As shown in FIG. 2, communication line 15 includes the usual two data signal conductors 33 and 34 and a shield conductor 31. Conductor 31 is grounded. Conductors 33 and 34 are the portions of telephone line 15 usually referred to as the tip and ring conductors. For the illustrated arrangement of circuit 14 it does not matter which of conductors 33 and 34 is the tip and which is the ring because a separate power supply (not shown) is provided for circuit 14.

A connector 35 connects telephone line 15 to control unit 14, whereas two connectors 36 and 37 provide operational connections to the lines 21 and 22 that extend to terminals 11 and 12 respectively. In the circuit shown in FIG. 2, conductor 33 is connected directly to data terminal 11. Conductor 33 is connected to terminal 12 through the normally closed contacts of a relay 42B. The other telephone line conductor 34 is connected to terminal 11 through a pair of normally closed contacts in a relay 41. Similarly, a set of normally closed contacts in a relay 42A connect telephone conductor 34 to facsimile terminal 12.

A ring signal detector circuit 43 is connected across the two telephone conductors 33 and 34 within switching unit 14, and the output RI of ring detector 43 is connected to a timing circuit unit 44. One output T1 from timing circuit 44 goes to a relay control circuit 45 that has an output connected to relay 41. Another output T2 from timing circuit 44 is extended to a relay control circuit 46 that actuates relays 42A and 42B. An additional output 47 from timing circuit 44 is connected to a mode control circuit 48 that has an output O/$\overline{\text{A}}$ to the relay control circuit 46 and to a modem 49; modem 49, in turn, has an output $\overline{\text{CD}}$ back to mode control 48. Modem 49 is supplied with information from telephone line conductors 33 and 34 through a coupling transformer 51 having its primary connected across conductors 33 and 34. The normally open contacts of a relay 50 are interposed in the primary circuit of transformer 51.

Within switching control 14 there is an off-hook detector 52 for terminal 11, connected in series with the data connection from line conductor 34 to that terminal. The output DOH of detector 52 is supplied to relay control 46 and to an AND gate 54. Another off-hook detector 53 is in series with the connection from terminal 12 to line conductor 34. The output signal FOH from detector 53 is supplied to AND gate 54 and to relay control circuit 45. The output of gate 54 is connected to a timer circuit 55 and the output signal T3 of timer 55 is applied to relay control 46 and to relay 50.

In considering the operation of the switching means comprising control unit 14, as shown in FIG. 2, operation of the circuit for an incoming call on communication line 15 is of prime concern because for such a call control unit 14 must discriminate between different types of calls; it must make a decision as to whether the call should be routed to the character (DDD/Economy Telex/computer terminal 11 or to the graphic (facsimile) terminal 12. Prior to the occurrence of such a call, it may be assumed that the contacts of relays 41, 42A and 42B are closed and the contacts of relay 50 are open; this is the normal, quiescent state for control unit 14. Thus, data terminals 11 and 12 are both connected to communication line 15. Of course, the two terminals are each in the on-hook condition, since there is no call in progress. An incoming call o communication line 15 starts with a ring signal. That ring signal is supplied to both of the data terminals 11 and 12 and is also applied to the ring signal detector circuit 43. The output signal RI from detector 43 actuates timing circuit unit 44 so that the timing circuits generate two verification time interval signals T1 and T2. For the present, it will be assumed that timing signals T1 and T2 both have a duration of about three seconds; variations are possible as discussed hereinafter in connection with FIG. 3.

The signal T1 from circuit 44 actuate relay control 45, which in turn energizes relay 41 to open the relay contacts. In this manner, and during the duration of signal T1, conductor 34 to terminal 11 is opened so that the first data communication terminal 11 is effectively disconnected from telephone line 15. A further relay can be provided to open line 33, but is usually unnecessary. In the same manner, signal T2 operates relay control circuit 46 to actuate relays 42A and 42B, opening their contacts and effectively disconnecting facsimile terminal 12 from both the tip and ring conductors of line 15. Disconnecting both terminals is done so that if the initial ring signal is too short in duration to be certain of detection by both data communication terminals, neither one of them can go to an off-hook condition. If one of terminals 11 and 12 were allowed to go off-hook without the other, at the start of a call, it would prevent a second ring signal from being sent. If that were to occur, the remaining terminal would not go off-hook and one answering routine, possibly the required routine for the incoming call, would be precluded. "Blinding" the modems of both of the terminals 11 and 12 with respect to a possible initial short ring signal assures that both will detect the next cycle of the ring signal and both will go off-hook.

Upon conclusion of verification interval signals T1 and T2 relays 41, 42A and 42B revert to their original operating condition, each with its contacts closed. Both of the data communication terminals 11 and 12 go off-hook during the silent period following the next cycle of the ring signal. Accordingly, DC loop current now flows through each terminal. This operating condition is detected by each of the two individual off-hook detectors 52 and 53, relative to terminals 11 and 12 respectively. The time intervals for operation of detectors 52 and 53 should be made unequal. For example, the timing for the outputs from detectors 52 and 53 may be established so that the output signal DOH from detector 52 occurs if loop current is present for approximately 150 milliseconds or longer whereas the output signal FOH from detector 53 is initiated if loop current flows for approximately 100 milliseconds or more.

When AND gate 54 receives both off-hook input signals FOH and DOH, it produces an output signal that actuates timer circuit 55. As a consequence, timer circuit 55 produces a recognition time interval output signal T3 that is supplied to relay control circuit 46, which again actuates relays 42A and 42B to open their contacts and disconnect facsimile terminal 12 from both the tip and ring conductors of communication line 15. This is done in order to permit control unit 14, by monitoring line 15, to determine whether the incoming call is intended for the character-by-character terminal 11. The recognition time signal T3 is also applied to relay 50 to close its contacts.

The output signal T3 from timer circuit 55 is of substantial duration; for example, the signal may be maintained for about eleven seconds. During this time period, the code recognition signals for terminal 11, such as the DDD answer and originate tones, are transmitted and detected, assuming that the incoming call is intended for terminal 11.

Regressing for a moment to the instant when the output signal RI from ring signal detector 43 was supplied to timing circuit 44, an output signal on line 47 was then also applied to mode control circuit 48. As a consequence, an output signal O/$\overline{\text{A}}$, supplied to modem 49 from control circuit 48, actuated modem 49 to its "originate" mode of operation. In this operating condition modem 49 monitors communication line 15 through a high impedance network coupled to transformer 51, a circuit that is operable because the contacts of relay 50 are closed. This makes it possible to monitor line 15 without loading it.

While in its "originate" mode, modem 49 monitors line 15, through the information supplied to the modem via transformer 51, for a DDD "answer" tone, usually 2225 Hz; for some standards that answer tone is 2100 Hz. As previously noted, in the case of Economy Telex modem 49 monitors the line for the same kind of tone, called an alerting tone, that is originated by the telephone system rather than terminal 11. In any event, when and if either the answer or alert tone is recognized, modem 49 signals this event to mode control 48 and to relay control 46 through its $\overline{CD}$ output. As a consequence, mode control 48 applies an output signal $O/\overline{A}$ to modem 49 to actuate the modem to its "answer" mode of operation, in which it is set to look for an "originate carrier" signal on telephone line 15. This may be a signal at 1270 Hz, 1200 Hz, or 980 Hz, depending upon the specific service utilized. For Economy Telex, the signal is at 1270 Hz but is developed by terminal 11 rather than by the telephone exchange.

If the "originate carrier" is identified by modem 49 this condition is signalled to relay control 46, based on output signals from modem 49. Accordingly, at the end of the delay interval T3 control 46 continues to maintain relay 42A and 42B open circuited so that facsimile terminal 12 is not and cannot be reconnected to line 15. On the other hand, in those instances in which the answer and originate tones (or other recognition signals for character terminal 11) have not been detected before the end of time interval T3 relay control 46 actuates relays 42A and 42B to again close their contacts and restore the connections from facsimile terminal 12 to communication line 15. That is, if the "handshaking" for terminal 11 is not completed during the T3 interval of about eleven seconds after both terminals 11 and 12 go off-hook, control unit 14 reconnects facsimile terminal 12 to line 15 and disconnects character terminal 11 from that line. At this stage, the incoming call is completed in the normal manner to facsimile terminal 12. Since it was not identified as a character transmission call intended for terminal 11, it should be and usually is a facsimile call intended for terminal 12. Of course, if the recognition signals for facsimile service cannot be completed at this stage of operation of station 10, facsimile terminal 12 reverts to an on-hook condition and the original quiescent state for station 10 is restored.

An operational nuance for control unit 14 and station 10 occurs when an incoming call originates from a facsimile machine that outputs a calling tone or CNG signal in accordance with the CCITT T.30 standard. This calling tone is an 1100 Hz signal that is repetitively on for 0.5 seconds and off for three seconds. The calling tone signal indicates a call originating from a non-speech terminal. This 1100 Hz calling tone signal could be detected erroneously as an "originate" tone for character transmission to terminal 11; however the transmission of an answer tone by the local terminal causes the calling facsimile terminal to stop sending the CNG tone. Thus, by the time control unit 14 switches to a condition in which it monitors line 15 for the originate tone, the CNG signal is no longer being sent. This prevents the facsimile call from being misinterpreted as a call for terminal 11.

In disconnecting facsimile terminal 12 from line 15 for time interval T3, usually about eleven seconds, to provide for monitoring of line 15 for the purpose of allowing time for a "handshake" to complete a call to terminal 11, there is little or no danger that an incoming call from a facsimile terminal will be interrupted by either the originating station or terminal 12 hanging up, so long as the facsimile transmission is essentially in conformance with standard CCITT T.30. Under that standard, the facsimile terminal from which the incoming call originates must wait for a minimum of thirty seconds to detect the group identification signal (GI signal) for the called terminal, in this instance terminal 12. The called machine, such as terminal 12, on the other hand, must continue to transmit its GI signal and to wait for a group command signal (GC signal) for thirty seconds minimum. Accordingly, it is seen that the nominal eleven second T3 delay creates little or no possibility of loss of a call to facsimile terminal 12.

Once control unit 14 has returned to its normal quiescent state, either of the two terminals 11 and 12 can seize communication line 15 to originate a call, provided a new ring signal is not detected on the line. A call originated by either of terminals 11 and 12, because it generates appropriate off-hook signals, actuates the relay control for the other terminal so that the other terminal is effectively disconnected from the line and cannot interfere with the call. Thus, if terminal 11 is taken off-hook at the outset of a locally originated character transmission call, the signal DOH from detector 52, applied to relay control 46, causes that control to actuate relays 42A and 42B, disconnecting facsimile terminal 12 from line 15. This disconnected condition for terminal 12 is maintained as long as terminal 11 remains off-hook. Similarly, the FOH output signal from detector 53, developed when terminal 12 goes off-hook in initiating a call, is applied to relay control 45 and actuates relay 41 to keep terminal 11 off the line during a local facsimile call.

Figure 3:
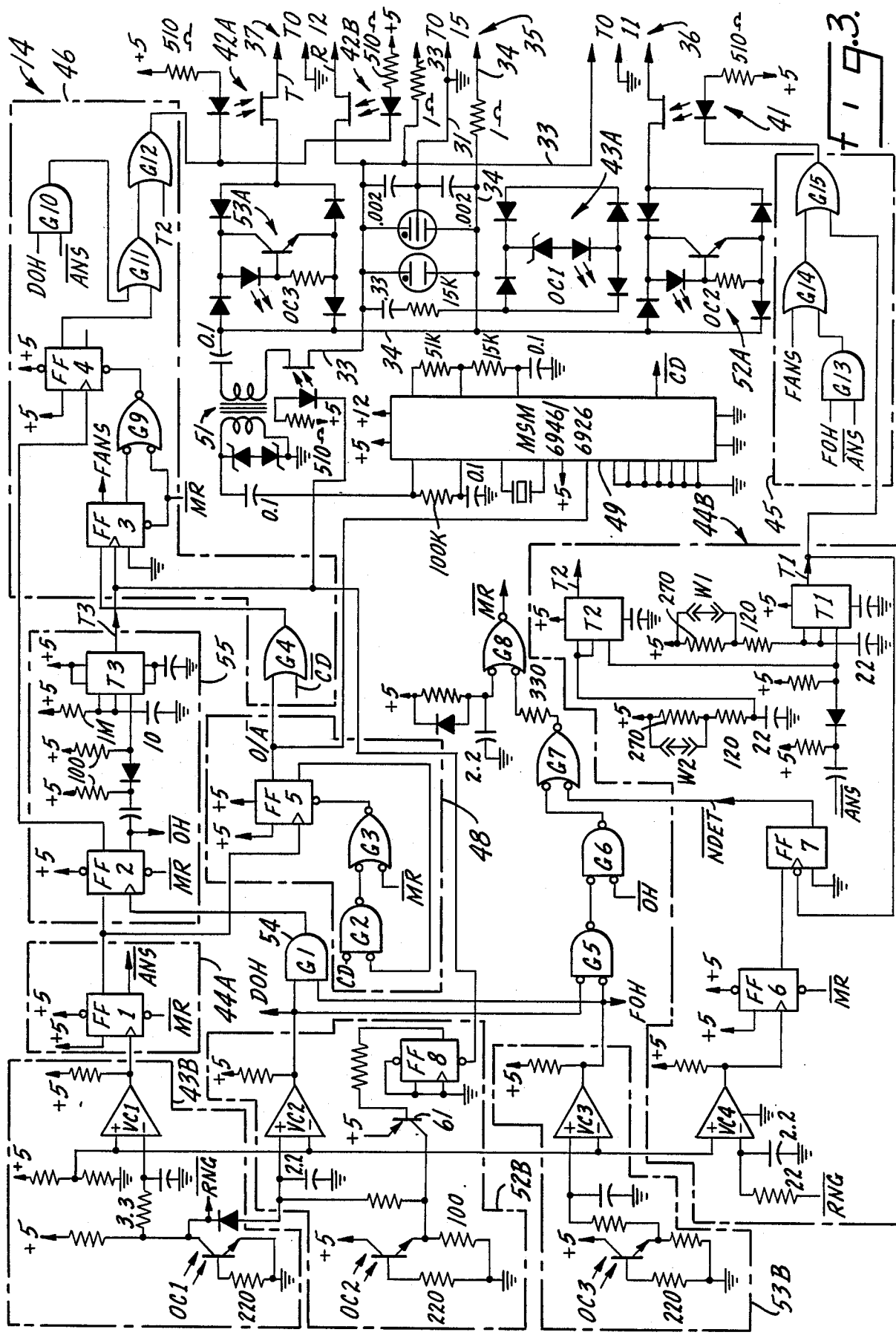
FIG. 3 is a detailed schematic circuit diagram for the embodiment of FIGS. 1 and 2.

FIG. 3 affords a detailed schematic circuit diagram for on embodiment of control unit 14 as heretofore described in connection with FIGS. 1 and 2. It includes circuit parameters and integrated circuit identification data. Unmarked resistors are 10 Kilohms, unmarked capacitors are 0.01 ufarads. Flip-flops FF1, 1, 2, 4–6, and 8 are type LS74, flip-flops FF3 and 7 are type LS107, timers T1 and T2 are type 555, and timer T3 is type 556. Type LS08 gates are employed for gates G1, G3, G7-G-10 and G13, type LS32 for gates G2, G4, G6, G11, G12, G14 and G15. The comparators VC1–VC4 are all type 339; the solid state optical relays are all type LCA110 and the optical control devices OC1–OC3 correspond to type 4N35. All resistor values are in ohms unless otherwise marked, all capacitor values in microfarads. In FIG. 3, the principal circuits and components from FIG. 2 are identified with the same reference numerals; it should be noted, however, that some of the circuits of FIG. 2 are split with parts in two different places in FIG. 3. For example, ring detector 43 comprises an optical coupler OC1 and a voltage comparator VC1; part of the optical coupler OC1 is at the right-hand side of FIG. 3 and a part is in circuit 43B at the left-hand side. Similar split situations apply to off-hook detectors 52 and 53 and to components of timing circuit 44. T aid in illustration of the relationship between the two drawings, many of the circuit chips from FIG. 3 are identified in FIG. 2.

As noted in the description of FIG. 2, it is desirable to provide for adjustment of time intervals T1 and T2. This is accomplished, in FIG. 3, by the two shunts or jumpers W1 and W2. If jumper W1 is in place, time interval T1 is three seconds. If jumper W1 is removed, then time interval T1 is nine seconds. Similarly, if jumper W2 is in place time interval T2 is three seconds but if it is removed T2 is nine seconds. The reason for the adjustment has to do with the requirements of terminals 11 and 12. Thus, if facsimile terminal 12 requires one more ring signal cycle than the modem of terminal 11, then jumper W1 should be removed to lengthen time interval T1. By thus extending interval T1 to nine seconds, blinding the modem of terminal 11 for an additional cycle of the ring signal, the extra ring required by facsimile terminal 12 is not cut off. Conversely, if terminal 11 requires one more ring than is necessary for terminal 12, jumper W2 should be removed, with jumper W1 still in place, to allow for reception of an additional cycle of the ring signal by terminal 11 and assure effective operation.

In the specific circuit arrangement shown in FIG. 3, time signal T1 also controls the operation of a noise detector circuit that checks to make sure that the incoming ring signal which activates detector 43 is of sufficient duration to be considered a valid ring signal and is not just switching noise on the telephone line. In Bell System Technical Publication 47001 it is recommended that terminals should reject any ring signal with a duration of less than about 100 milliseconds. Ring detector 43 in the circuit of FIG. 3, on the other hand, comprising optical coupler OC1 and comparator VC1, is responsive to signals having durations of the order of only one millisecond. This has been done because control unit 14 may be operating with terminals that respond to ring signals of appreciably less than 100 milliseconds. If relays 41, 42A and 42B are not turned off before one of the two terminals interprets the incoming signal as a valid ring signal, that terminal will go of-hook prematurely, preventing any additional ring signal from being sent; the call cannot then be completed properly.

In the event that the incoming signal is actually noise, and not a valid ring signal, the noise detector in the circuit of FIG. 3 acts to reset control unit 14 to the normal quiescent state. The noise detector includes a voltage comparator VC4 driven by a signal $\overline{RNG}$ from the same optical coupler OC1 that is a part of ring detector 43B; comparator VC4, however, has a response time of approximately one hundred milliseconds. If the incoming ring signal is detected as being sufficiently long to cause the output of comparator VC4 to switch to a "one", then the flip-flop FF6 is set, causing its output to flip-flop FF7 to go to "zero". In these circumstances, at the end of interval T1 flip-flop circuit FF7 will not be set and no master reset action is initiated; the call proceeds.

However if the incoming ring signal is too short and comparator VC4 does not switch to a "one", flip-flop FF6 will not be set and flip-flop FF7 will be set, with its output to gate G7 going to zero. The end result of this action is the generation of a master reset signal $\overline{MR}$ by gate G8 that resets flip-flops FF1 and FF7 (and all other circuits in control 14) to their original conditions. The resetting of flip-flop FF7 subsequently terminates the $\overline{MR}$ signal. It will be recognized that reset to the normal quiescent state of control unit 14 may also be achieved by generation of a $\overline{MR}$ signal responsive to changes in the DOH and FOH input signals to gate G5 indicative of both of the terminals 11 and 12 being on-hook. This master reset also requires a $\overline{OH}$ signal to gate G6 from flip-flop FF2 in timer circuit 55.

The PNP transistor 61 in the off-hook detector circuit 52B has its base driven by a signal from a flip-flop FF8 that is actuated by the recognition interval signal T3. In this circuit, transistor 61 is "on" during each interval T3, preventing the signal DOH from going low. This is done because some Economy Telex terminals go on-hook after waiting only five seconds for an alert tone. The solid state relays controlling the line to facsimile terminal 12 are open during time T3 and signal FOH is accordingly low. If DOH is allowed to go low (on-hook) before T3 is ended, a reset signal $\overline{MR}$ will be generated too soon, so that FF3 is set too soon with no way to reset it. Transistor 61 and FF8 preclude DOH from going low until after T3 times out so that $\overline{MR}$ is not generated prematurely.

Figure 4:
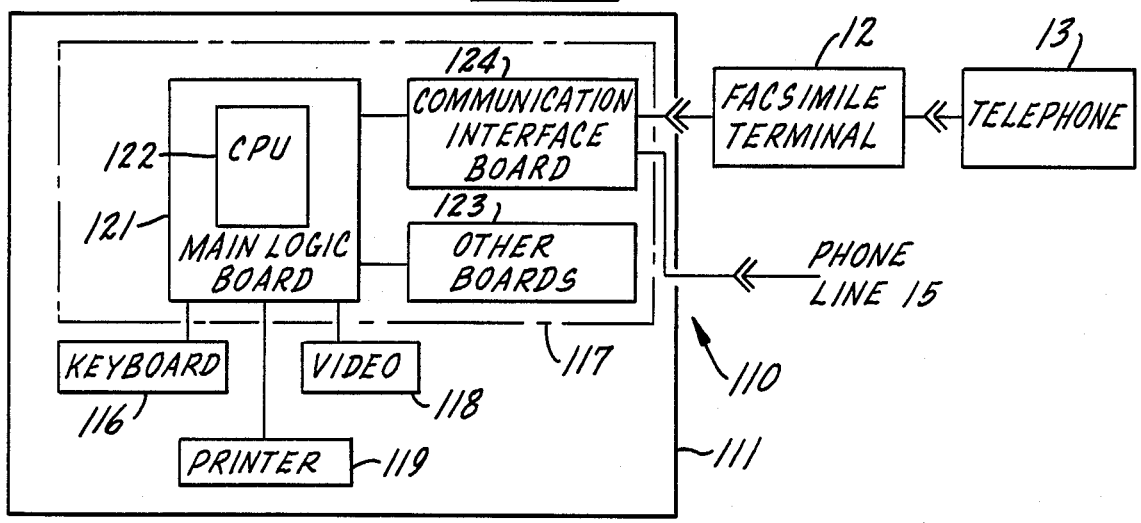
FIG. 4 is a simplified block diagram utilized to explain a further embodiment of the apparatus of the invention.
Figure 5:
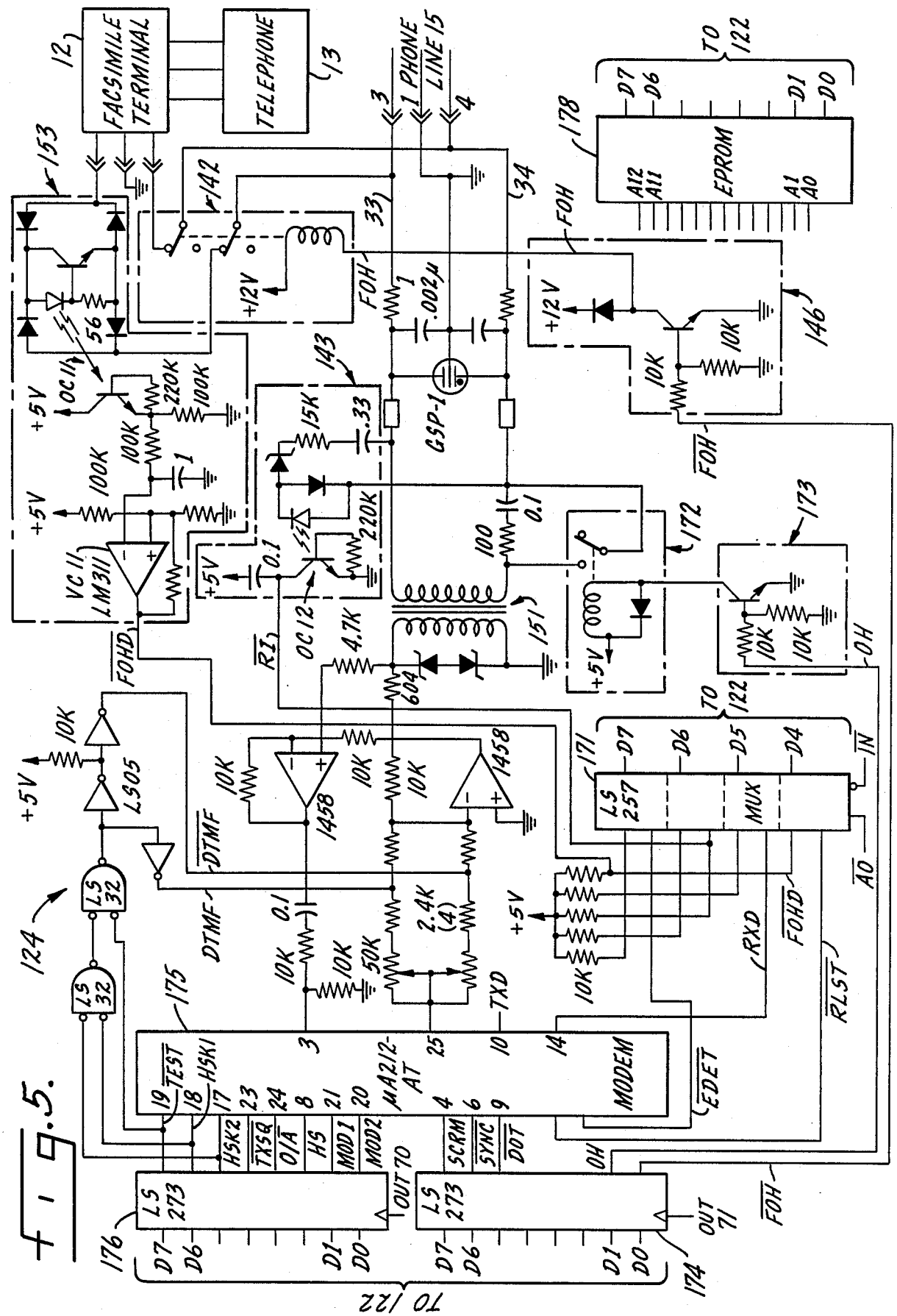
FIG. 5 is a schematic circuit diagram for the embodiment of FIG. 4.

FIGS. 4 and 5 illustrate another embodiment of the invention, in which discrimination between incoming calls based on two different transmission standards, such as a facsimile call and a DDD call, are carried out by automated switching circuits that are incorporated in one of the terminals. More specifically, in FIGS. 4 and 5 the circuits for determining the nature of an incoming call on telephone line 15 and for supplying that call to a facsimile terminal 12 or to a character transmission (DDD/ASCII or Economy Telex) terminal 111 are incorporated in terminal 111 and utilize a part of its internal microprocessor control.

The data communication station 110 illustrated in FIG. 4 comprises a character transmission transceiver terminal 111, typically a transceiver usable for DDD, telex, and/or TWX service; terminal 111 could also be a computer terminal. It includes a keyboard 116, a logic and control circuit unit 117, a video monitor 118, and a suitable printer 119. Internally, the main control unit 117 comprises a main logic board 121 that is connected to the individual operating units 116, 118, and 119. A principal component of board 121 is a microprocessor, a central processing unit 122. The main logic board 121 is connected to a plurality of additional circuit boards 123 and to a communication interface board 124 employed to connect terminal 111 to a phone line 15. In station 110, it is the communication interface board 124 employed to connect terminal 111 to a phone line 15. In station 110, it is the communication interface board 124 that is connected to a facsimile terminal 12. A telephone 13 may be connected to terminal 12 in the usual manner. The interface board 124, for which a specific circuit is shown in FIG. 5, in conjunction with CPU 122, discriminates between incoming character transmission calls and facsimile calls, completing the former by operation of terminal 111 but connecting the latter to terminal 12.

As shown in FIG. 5, the data conductors 33 and 34 of phone line 15 are connected to facsimile terminal 12 through the normally closed contacts of an electromagnetic relay 142. A facsimile off-hook detector circuit 153 comprising an optical coupler OC11 is connected to line 33 in the same manner as in the circuit arrangement of FIG. 3. Optical coupler OC11 is connected to a voltage comparator VC11. The output signal $\overline{FOHD}$ of detector 153 is connected to one of four multiplex units in an integrated circuit 171 that includes four external bus connections D4–D7 that are part of a bus connected to the CPU 122 of the main logic board 121 (FIG. 4).

As shown in FIG. 5, board 124 further comprises a transformer 151 having its primary connected across telephone line conductors 33 and 34; one side of the transformer primary is connected to conductor 34 through the normally open contacts of a relay 172. There is a relay control circuit 173 for actuating relay 172. Control 173 is energized by an input signal OH derived from a circuit 174 that is connected to the CPU 122 of terminal 111 through a bus D0–D7. A similar control circuit 146 actuates relay 142. The input signal $\overline{FOH}$ to control circuit 146 is also derived from circuit 174.

Much of the circuit 124 shown in FIG. 5 is essentially conventional. It includes a modem 175 having a substantial number of connections to the CPU of terminal 111 through bus D0–D7, by way of integrated circuits 174 and 176. Those circuits pertaining to normal interface functions of terminal 111 are not described in detail here. Modem 175 does have a circuit connection RXD to multiplexer 171, so that the RXD signal is supplied to the microprocessor control for the terminal, CPU 122, via bus conductors D4–D7. There is a similar connection for an additional output signal $\overline{\text{EDET}}$ from the modem through multiplexer 171 and the data bus to the microprocessor controlling the character transmission terminal 111.

In operation of the embodiment of the invention shown in FIGS. 4 and 5, for which a partial flow chart is provided in FIG. 6, an incoming call produces a ring signal across the two telephone line conductors 33 and 34. As before, it is not critical which of these is the tip conductor and which is the ring conductor, since circuit 124 does not derive its power from the telephone line. The ring signal is supplied to facsimile terminal 12 a well as to telex/DDD terminal 111, since terminal 12 is connected to the telephone line through the normally closed contacts of relay 142. Facsimile terminal 12 monitors the ring signal in conventional manner and, if it determines that the ring signal is valid, goes off-hook. The facsimile off-hook detector 153, accordingly, produces a low or "zero" output signal $\overline{\text{FOHD}}$.

The incoming ring signal indicative of a call to station 110 (FIG. 4) also actuates the optical coupler OC12 in the ring signal detector 143. The output signal $\overline{\text{RI}}$ from detector 143 is supplied to the CPU 122 of terminal 111 through multiplexer 171 and bus connections D4–D7. The program for CPU 122, a part of which may be in an erasable programmable read-only memory chip 178 that is a part of board 124, determines whether the $\overline{\text{RI}}$ signal from detector 143 is indicative of a valid ring signal. This is the initial step 201 in the flow chart, FIG. 6.

Assuming that CPU 122 decides that the signal from detector 143 does identify a valid incoming ring signal, the CPU next looks at the $\overline{\text{FOHD}}$ signal from detector 153, which it also receives through multiplexer 171, to determine whether facsimile terminal 12 has gone off-hook. Once it determines that there is a valid ring signal and that the facsimile terminal 12 has gone off-hook, the CPU is programmed to send a low or "zero" $\overline{\text{FOH}}$ signal to control circuit 146 (FIG. 5) to energize relay 142 and open its contacts. Thus, at an early stage in the discrimination procedure used to determine whether the incoming call is a facsimile call or a character transmission call, facsimile terminal 12 is disconnected from the telephone line, just as was done for the embodiment of FIGS. 1–3. See step 204 in FIG. 6.

The call discriminator operation of board 124, working with CPU 122, should not be allowed to become hung up on an incoming call if facsimile terminal 12 is out of paper, has been physically disconnected from the telephone line (e.g., for repair or servicing), or simply malfunctions by failing to go off-hook. Thus, the program for this embodiment of the invention keeps checking $\overline{\text{FOHD}}$ to determine whether terminal 12 is off-hook for N ring signal cycles; typically, N=4. If terminal 12 has not gone off hook after that interval, the program assumes terminal 12 is not present or is not functioning as it should and causes terminal 111 to take itself off-hook, followed by a disconnect of terminal 12.

At this stage of operation an off-hook signal OH, generated by the CPU of terminal 111 and supplied to board 124 (FIG. 5) through circuit 174, has gone to a high or "one" state. This OH signal is applied to relay control 173, causing it to energize relay 172. The contacts of relay 172 close, effectively connecting transformer 151 across the telephone line data conductors 33 and 34. At this stage the incoming call has been answered; board 124 appears as an off-hook terminal to telephone line 15, but facsimile terminal 12 is disconnected from the telephone line. On the other hand, logic board 124 and the CPU 122 with which it interacts have not yet decided whether the incoming call is a facsimile call or some form of DDD/telex call. That is, the operation of station 110, and specifically the call discriminator control afforded by CPU 122 and board 124, FIGS. 4 and 5, has performed steps 201 through 204 in FIG. 6 and is ready to determine the nature of the call.

At this stage of its operation, step 205 in FIG. 6, board 124, based on its program in EPROM 178 for CPU 122, takes no positive action for a predetermined time interval of approximately three seconds. During this period telephone line 15 is monitored for the presence of an Economy Telex alert tone, at a frequency of 2225 Hz. If that tone is detected, then the discriminator control concludes that the incoming call is an Economy Telex call and proceeds on that basis, with the incoming signals supplied to terminal 111 through modem 175 and its connections to the CPU 122 and other logic of the character transmission terminal 111.

If the incoming call is not an Economy Telex call, no alert tone will have been received at the end of the aforementioned delay interval of approximately three seconds. In those circumstances, proceeding to step 206 of FIG. 6, an answer tone of 2225 Hz is supplied to line 15 by modem 175. This answer tone, sometimes referred to as a carrier, is maintained for a predetermined time interval, usually about two seconds. During this time interval, the signals on line 15 are monitored by modem 175 to ascertain whether a data return signal is being received from the call originating station. When an appropriate return signal is found, an output signal $\overline{\text{EDET}}$ is supplied to the CPU 122 of terminal 111 by way of multiplexer 171, FIG. 5. When this happens, the CPU is programmed to set modem 175 for reception of a call at a 300 Baud rate. The CPU then monitors the RXD signal output from modem 175. If the RXD signal provides a steady high for a period of approximately 100 milliseconds, indicative of a low speed "mark", it is concluded that the incoming call is a low speed DDD call and operation continues on that basis. This is at stage 207 in FIG. 6. The low speed DDD call proceeds in the usual manner.

It may happen, however, that the monitoring of the RXD signal at this stage of operation shows a low at least about one-fourth of the time. In these circumstances, the system comprising board 124 and CPU 122 is programmed to condition modem 175 for high speed operation, at a Baud rate of 1200. Subsequently, the RXD signal is again monitored to determine whether it constitutes a high or mark signal for continuous periods of 780 milliseconds; see the step 208 in FIG. 6. In these circumstances, the call proceeds at the higher DDD rate.

Of course, the incoming call may not be intended for receiver 111 at all. That is, it may be a facsimile call instead of an Economy Telex or DDD/ASCII call. In that situation, the entire program shown in simplified form in FIG. 6 is carried out to step 209, at which point the answer tone or carrier is discontinued. The $\overline{\text{FOH}}$ signal to circuit 146 actuates that circuit to de-energize relay 142 so that its contacts again close. Accordingly, facsimile terminal 12 is reconnected to phone line 15 and the facsimile call is taken at terminal 12. Relay 172 is also de-energized, effectively disconnecting terminal 111 from the line.

As in the case of the embodiment of FIGS. 1-3, it is seen that the embodiment of FIGS. 4-6 takes advantage of the CCITT standard T.30 for facsimile transmission, which requires a transmitting facsimile terminal to try to establish a call connection for a certain period of time (thirty seconds) before disconnecting. Stations constructed in accordance with the present invention take advantage of this "window" to check for Economy Telex calls and for DDD calls, allowing the stations to function properly for both kinds of calls though utilizing only one transmission line. In the embodiment of FIGS. 4-6, as in FIGS. 1-3, the recognition time interval (steps 205-208) is preferably about eleven seconds.

Of course, for station 110 of FIGS. 4-6, there may be times when the station is being serviced or power is cut off to terminal 111 for one reason or another. Under these circumstances, an incoming facsimile call can and will be handled in the usual manner by facsimile terminal 12, since that terminal remains connected to the telephone line through the contacts of relay 142. Station 110 does not disable either of its terminals 111 or 12 when the other terminal is taken out of action.

When a call is to be transmitted from terminal 12 onto telephone line 15, the system operator utilizes the facsimile terminal in the usual manner, employing the telephone instrument 13 to obtain the proper circuit connection if necessary. There is nothing to inhibit this outgoing call, assuming that the character transmission terminal 111 is not in the process of carrying out a call. The facsimile call proceeds in the usual manner.

When the character transmission terminal 111 is to place an outgoing call, the preliminary steps toward initiation of that call include actuation of the CPU of the terminal to check the $\overline{\text{FOHD}}$ output signal from detector 153. Of course, if the facsimile terminal is in an off-hook condition, the line appears busy so that the character transmission terminal 111 cannot go forward with the call. In these circumstances, terminal 111 follows the usual routine for a "busy" line; it waits and re-trys at a later time. On the other hand, if line 15 is available, this situation is indicated by the output signal from detector 153 and the DDD outgoing call can go forward. As part of this call routine, relay 142 is energized and facsimile terminal 12 is disconnected from the communication line. If facsimile terminal 12 subsequently tries to establish a call while the DDD call is in progress, it cannot do so because it sees an open line at the contacts of relay 142.

Although the two specific embodiments described above, from FIGS. 1-3 and FIGS. 4-6, are substantially different from each other in many physical respects, they are actually quite closely related. Each embodiment includes a first data terminal operating under a first transmission standard under which a call starts with a preliminary ring signal followed by one or more subsequent recognition signals. In the embodiment of FIGS. 1-3 this first data terminal is a DDD/telex terminal 11, which may be entirely conventional in construction. In the embodiment of FIGS. 4-6, the first terminal 111 is again a character transmission terminal but in this instance the selective switching apparatus of the invention is incorporated in the terminal itself. For both embodiments, there is a second data terminal operating under a second transmission standard; for both embodiments this second data terminal is the facsimile terminal 12, which may be entirely conventional in construction and operation. In both embodiments, each of the two terminals may be operable under two or more related but somewhat different transmission standards.

In the embodiment of FIGS. 1-3, the first terminal 11 is connected to the communication line 15 by a first relay 41. This is also true of the second embodiment, though a somewhat different relay arrangement comprising the relay 172 is utilized in connecting the character terminal 111 to telephone line 15. Each embodiment provides separate relay means to connect facsimile terminal 12 to the line. In FIGS. 2 and 3 this means is the optical relays 42A and 42B whereas FIG. 5 utilizes an electromechanical relay 142. The first embodiment has an off-hook detector 52 that determines when its DDD/telex terminal 11 is off-hook. In the embodiment of FIGS. 4-6, this off-hook detection function for the first terminal is performed by the CPU of the terminal itself, which acts as a part of the selective switching control in response to programming provided in EPROM 178, FIG. 5. Both embodiments afford a separate off-hook detector circuit for determining when the facsimile terminal is off-hook. These are detector 53 in FIGS. 2 and 3 and detector 153 in FIG. 5.

The hard-wired embodiment of FIGS. 1-3 has a separate timing circuit for measuring the recognition time interval T3 that is utilized in both embodiments to determine whether a call is intended for the first terminal. In the control of FIGS. 4-6, this recognition timer means for determining T is provided by appropriate programming of the CPU of the terminal itself. In each instance, the recognition timer means actuates a relay control, circuit 46 in FIGS. 2 and 3 and circuit 146 in FIG. 5, to disconnect facsimile terminal 12 from line 15 during each recognition time interval T3. During the recognition time interval circuits 48-51 afford an effective monitoring means, in the embodiment of FIGS. 2 and 3, looking for recognition signals pertaining to the telex/DDD terminal. The same operation is performed in the circuit of FIG. 5 by modem 175 with an assist from CPU 122 of terminal 111. In each instance, the monitoring means continues to maintain the facsimile terminal disconnected from the communication line when a character transmission call is identified and is in progress. Conversely, if no such call is identified, in each instance the monitoring means actuates the relays to take the control to a condition for a facsimile call at the end of the recognition time interval.

We claim:

1. In the operation of a data communication station comprising a first data terminal operating under a first transmission standard under which an incoming call starts with a preliminary ring signal and a subsequent recognition signal, a second data terminal operating under a second, different transmission standard under which an incoming call starts with a preliminary ring signal and may include a subsequent recognition signal, and selective switching means for connecting a telephone line or like communication line to either of the data terminals for completion of an incoming call that starts with a ring signal, in which station the switching means normally maintains at least one of the data terminals connected to the communication line in on-hook condition prior to initiation of a call, the method of operation, for an incoming call, comprising:

A. permitting the one data terminal, responsive to a ring signal received on the communication line, to go off-hook;

B. disconnecting the one data terminal from the communication line, by operation of the switching means, without signalling an on-hook condition to the communication line;

C. monitoring the communication line for occurrence of a recognition signal within a given recognition time interval T3; and D. actuating the switching means to connect only the first data terminal to the communication line, off-hook, to complete the call to the first data terminal, when a recognition signal from the first transmission standard is identified during interval T3 in step C; and E. actuating the switching means to connect only the second data terminal to the communication line, off-hook, to complete the call to the second data terminal when no recognition signal from the first transmission standard is identified during interval T3 in step C.

2. The method of operation of a data communication station, according to claim 1, in which:

the one data terminal referred to in steps A and B is the second data terminal; and in step C the communication line is monitored for occurrence of a recognition signal from the first transmission standard.

3. The method of operation of a data communication station, according to claim 2, in which:

the first data terminal is a character transmission terminal operable under a plurality of different first transmission standards each providing at least one distinctive recognition signal; and the second data terminal is a graphic transmission terminal.

4. The method of operation of a data communication station, according to claim 3, in which:

in step C the communication line is monitored successively for recognition signals from each of the different first transmission standards.

5. The method of operation of a data communication station, according to claim 4, in which the recognition time interval T3 of step C is approximately eleven seconds.

6. The method of operation of a data communication station, according to claim 4, in which, in step C, the communication line is monitored successively for recognition signals for:

Economy Telex;
DDD low speed; and
DDD high speed.

7. The method of operation of a data communication station, according to claim 6, in which, in step E:

if no recognition signal from any of the second transmission standards is identified within a second given recognition time interval, both terminals are restored to on-hook condition.

8. The method of operation of a data communication station, according to claim 1 in which:

the switching means normally maintains both data terminals connected to the communication line in on-hook condition prior to initiation of a call;

in step A both data terminals go off-hook in response to an incoming ring signal;

in step B only the second data terminal is disconnected; and in step C the communication line is monitored for a recognition signal from the first transmission standard.

9. The method of operation of a data communication station, according to claim 8, in which:

the first data terminal is a character transmission terminal operable under a plurality of different first transmission standards each providing at least one distinctive recognition signal;

the second data terminal is a graphic transmission terminal; and in step C the communication line is monitored successively for recognition signals from each of the different first transmission standards.

10. The method of operation of a data communication station, according to claim 9, in which the recognition time interval T3 of step C is approximately eleven seconds.

11. The method of operation of a data communication station, according to claim 9, in which, in step C, the communication line is monitored successively for recognition signals for:

Economy Telex;
DDD low speed; and
DDD high speed.

12. The method of operation of a data communication station, according to claim 11, in which, in step E:

if no recognition signal from any of the second transmission standards is identified within a second given recognition time interval, both terminals are restored to on-hook condition.

13. The method of operation of a data communication station, according to claim 8 in which:

in step A the operating condition of the two data terminals is monitored to determine whether both have gone off-hook; and whenever the second data terminal fails to go off-hook after N ring signal cycles, the remainder of steps B through D are carried out as if the second data terminal were off-hook.

14. The method of operation of a data communication station, according to claim 1, and further comprising:

X. prior to step A, disconnecting both data terminals from the communication line for predetermined verification time intervals T1 and T2 each long enough to verify if the incoming signal is a valid ring signal; and Y. inhibiting step A and all subsequent steps if no ring signal is verified in step X.

15. The method of operation of a data communication station, according to claim 14 in which:

the switching means normally maintains both data terminals connected to the communication line in on-hook condition prior to initiation of a call;

in step A both data terminals go off-hook in response to an incoming ring signal;

in step B only the second data terminal is disconnected; and in step C the communication line is monitored for a recognition signal from the first transmission standard.

16. The method of operation of a data communication station, according to claim 15, in which:

the first data terminal is a character transmission terminal operable under a plurality of different first transmission standards each providing at least one distinctive recognition signal;

the second data terminal is a graphic transmission terminal; and in step C the communication line is monitored successively for recognition signals from each of the different first transmission standards.

17. The method of operation of a data communication station, according to claim 15 in which:

in step A the operating condition of the two data terminals is monitored to determine whether both have gone off-hook; and whenever the second data terminal fails to go off-hook after N ring signal cycles, the remainder of steps B through D are carried out as if the second data terminal were off-hook.

18. A control for selectively switching a telephone line or like communication line to serve both a first data terminal, operating under a first transmission standard under which an incoming call starts with a preliminary ring signal and a subsequent recognition signal, and a second data terminal, operating under a second transmission standard under which an incoming call starts with a preliminary ring signal and a subsequent recognition signal, comprising:

second terminal relay means for connecting the second terminal to the communication line;

a first off-hook detector for determining whether the first terminal is off-hook;

a second off-hook detector for determining whether the second terminal is off-hook;

recognition timer means, connected to both off-hook detectors, for measuring a predetermined recognition time interval T3, starting from the time at which both terminals go off-hook in response to a ring signal on the communication line;

second relay control means, connected to the timer means and to the second terminal relay means, for actuating the second terminal relay means to disconnect the second terminal from the communication line during the interval T3; and monitoring means for monitoring the communication line for occurrence of a recognition signal from the first transmission standard during the interval T3;

the second relay control means further being connected to the monitoring means and maintaining the second terminal disconnected from the communication line in response to occurrence of a recognition signal from the first transmission standard during the interval T3.

19. A control for selectively switching a communication line to serve first and second data terminals, according to claim 18, in which:

the first data terminal is a character transmission terminal; and the second data terminal is a graphic transmission terminal.

20. A control for selectively switching a communication line to serve first and second data terminals, according to claim 19, in which:

the first data terminal is a DDD/Economy Telex terminal;

the second data terminal is a facsimile terminal; and the recognition time interval T3 is about eleven seconds.

21. A control for selectively switching a communication line to serve first and second data terminals, according to claim 19, in which:

the control further comprises first terminal relay means for connecting the first terminal to the communication line; and both relay means normally maintain their respective data terminals connected to the communication line when there is no call in progress.

22. A control for selectively switching a communication line to serve first and second data terminals, according to claim 18, and further comprising:

first terminal relay means for connecting the first terminal to the communication line; and first relay control means, connected to the first terminal relay means and to the second off-hook detector, for actuating the first terminal relay means to disconnect the first terminal from the communication line when the recognition time interval expires without identification of a recognition signal from the first transmission standard.

23. A control for selectively switching a communication line to serve first and second data terminals, according to claim 22, in which the first relay control means actuates the first terminal relay means to connect the monitoring means to the communication line at the beginning of the recognition time interval T3.

24. A control for selectively switching a communication line to serve first and second data terminals, according to claim 22, and further comprising:

a ring signal detector, connected to the communication line, capable of reacting to an incoming ring signal much faster than either data terminal;

ring signal verification timing means, connected to the ring signal detector and to both relay control means, for measuring first and second ring signal verification time intervals;

each relay control means actuating its associated relay means to disconnect its terminal from the communication line during its ring signal verification time interval.

25. A control for selectively switching a communication line to serve first and second data terminals, according to claim 24, in which:

the monitoring means comprises a modem and a mode control circuit connected to the modem and to the ring signal verification timing means, the mode control circuit actuating the modem to an originate mode of operation for an initial part of the ring signal verification time intervals;

and reset means to terminate an incoming call and restore the control to an original quiescent state if the modem does not verify presence of a ring signal prior to expiration of the ring signal verification time intervals.

26. A control for selectively switching a communication line to serve first and second data terminals, according to claim 24, in which the ring signal verification time intervals are each about three to nine seconds.

27. A control for selectively switching a communication line to serve first and second data terminals, according to claim 22, in which the entire control is mounted in a small separate cabinet adapted for cable connection to a conventional DDD/telex terminal as the first data terminal and to a conventional facsimile terminal as the second data terminal.

28. A control for selectively switching a communication line to serve first and second data terminals, according to claim 8, in which the control is incorporated in a first data terminal of the kind which includes a central processor unit connected to a data bus, and in which the first off-hook detector and the recognition timer means comprise a program for the central processor unit of the first data terminal.

* * * * *